(12) United States Patent  
Talley et al.

(10) Patent No.: US 9,173,185 B1  
(45) Date of Patent: Oct. 27, 2015

(54) METHODS AND SYSTEMS FOR MANAGING REGISTRATION SIGNALING BASED ON OFF-TIME DURATION

(75) Inventors: Ryan S. Talley, Overland Park, KS (US); Kyle C. Allen, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 251 days.

(21) Appl. No.: 13/442,973

(22) Filed: Apr. 10, 2012

(51) Int. Cl.  
*H04W 4/00* (2009.01)  
*H04W 60/00* (2009.01)

(52) U.S. Cl.  
CPC .................................. *H04W 60/00* (2013.01)

(58) Field of Classification Search  
CPC ....... H04W 8/04; H04W 60/00; H04W 60/02; H04W 60/04; H04W 60/06  
See application file for complete search history.

(56) References Cited

U.S. PATENT DOCUMENTS

| | | | |
|---|---|---|---|
| 5,327,144 A | 7/1994 | Stilp et al. | |
| 5,450,613 A | 9/1995 | Takahara et al. | |
| 5,475,735 A | 12/1995 | Williams et al. | |
| 5,515,419 A | 5/1996 | Sheffer | |
| 5,564,072 A | 10/1996 | Garcia Aguilera et al. | |
| 5,603,095 A | 2/1997 | Uola | |
| 5,754,959 A | 5/1998 | Ueno et al. | |
| 5,794,140 A | 8/1998 | Sawyer | |
| 5,812,955 A | 9/1998 | Dent et al. | |
| 5,826,958 A | 10/1998 | Avitan | |
| 5,982,146 A | 11/1999 | Nguyen | |
| 5,991,885 A | 11/1999 | Chang et al. | |
| 6,014,694 A | 1/2000 | Aharoni et al. | |
| 6,028,915 A | 2/2000 | McNevin | |
| 6,064,889 A * | 5/2000 | Fehnel | 455/511 |
| 6,078,568 A | 6/2000 | Wright | |
| 6,078,821 A | 6/2000 | Kaschke et al. | |
| 6,078,957 A | 6/2000 | Adelman et al. | |
| 6,088,589 A | 7/2000 | Valentine et al. | |
| 6,108,542 A | 8/2000 | Swanchara et al. | |
| 6,163,131 A | 12/2000 | Gartstein et al. | |
| 6,173,350 B1 | 1/2001 | Hudson et al. | |
| 6,195,705 B1 | 2/2001 | Leung | |
| 6,201,856 B1 | 3/2001 | Orwick et al. | |
| 6,215,279 B1 | 4/2001 | Rakovski et al. | |
| 6,239,578 B1 | 5/2001 | Schnell et al. | |
| 6,301,472 B1 | 10/2001 | Nakasu et al. | |
| 6,393,285 B1 | 5/2002 | Stephens | |
| 6,430,395 B2 | 8/2002 | Arazi et al. | |
| 6,433,511 B1 | 8/2002 | Bohne | |
| 6,434,134 B1 | 8/2002 | La Porta et al. | |

(Continued)

OTHER PUBLICATIONS

Donegan, Michelle; "Femtocells Kick Apps," http://www.lightreading.com/document.asp?doc_id=178423, Jun. 24, 2009.

(Continued)

*Primary Examiner* — Vladimir Magloire  
*Assistant Examiner* — Shantell L Heiber (57) ABSTRACT

Systems and methods are disclosed herein for managing the extent of registration signaling that a communication device sends when activating a network process, based on how long the process was turned off. For instance, if the device turns off without deregistering from a communication network and then turns on while the network registration is still current, an example system or method may help the device to recognize this situation and reduce unnecessary signaling associated with restarting a network process.

19 Claims, 5 Drawing Sheets

(56) References Cited

U.S. PATENT DOCUMENTS

| | | |
|---|---|---|
| 6,501,746 B1 | 12/2002 | Leung |
| 6,503,095 B1 | 1/2003 | Endo et al. |
| 6,577,882 B1 | 6/2003 | Roos |
| 6,598,003 B1 | 7/2003 | Heino et al. |
| 6,651,105 B1 | 11/2003 | Bhagwat et al. |
| 6,681,256 B1 | 1/2004 | Kuntze et al. |
| 6,707,888 B1 | 3/2004 | Cope |
| 6,725,044 B2 | 4/2004 | Verma et al. |
| 6,775,563 B2 | 8/2004 | Younis |
| 6,819,926 B2 | 11/2004 | Karlsson et al. |
| 6,826,154 B2 | 11/2004 | Subbiah et al. |
| 6,836,644 B2 | 12/2004 | Bacon et al. |
| 6,859,651 B2 | 2/2005 | Gabor |
| 6,940,407 B2 | 9/2005 | Miranda-Knapp et al. |
| 6,978,137 B2 | 12/2005 | Gwon et al. |
| 6,992,599 B2 | 1/2006 | Vergnaud et al. |
| 6,992,995 B2 | 1/2006 | Agrawal et al. |
| 7,130,641 B1 | 10/2006 | Al-Khashti et al. |
| 7,133,386 B2 | 11/2006 | Holur et al. |
| 7,162,236 B2 | 1/2007 | Dorenbosch et al. |
| 7,213,065 B2 | 5/2007 | Watt |
| 7,260,399 B1 | 8/2007 | Oh et al. |
| 7,280,505 B2 | 10/2007 | Chaskar et al. |
| 7,317,709 B2 | 1/2008 | Jang et al. |
| 7,350,077 B2 * | 3/2008 | Meier et al. ............. 713/171 |
| 7,356,015 B2 | 4/2008 | Ibe et al. |
| 7,388,466 B2 | 6/2008 | Ghabra et al. |
| 7,529,544 B1 | 5/2009 | Oh et al. |
| 7,532,894 B1 * | 5/2009 | Muhonen et al. ......... 455/456.1 |
| 7,613,142 B2 | 11/2009 | Molteni et al. |
| 7,634,558 B1 | 12/2009 | Mangal et al. |
| 7,697,489 B1 | 4/2010 | Apte et al. |
| 7,715,884 B2 | 5/2010 | Book et al. |
| 8,112,083 B1 | 2/2012 | Sigg et al. |
| 2002/0049059 A1 | 4/2002 | Soininen et al. |
| 2002/0057658 A1 | 5/2002 | Lim |
| 2002/0068570 A1 | 6/2002 | Abrol et al. |
| 2002/0090945 A1 | 7/2002 | Sasada |
| 2002/0098859 A1 | 7/2002 | Murata |
| 2002/0152432 A1 | 10/2002 | Fleming |
| 2002/0152446 A1 | 10/2002 | Fleming |
| 2002/0164993 A1 | 11/2002 | Elliot |
| 2002/0191627 A1 | 12/2002 | Subbiah et al. |
| 2003/0017843 A1 | 1/2003 | Noblins |
| 2003/0039360 A1 | 2/2003 | Younis |
| 2003/0053431 A1 | 3/2003 | Madour |
| 2003/0060215 A1 | 3/2003 | Graham |
| 2003/0062872 A1 | 4/2003 | Brotto |
| 2003/0073438 A1 | 4/2003 | Fukushima et al. |
| 2003/0074572 A1 | 4/2003 | Hayashi |
| 2003/0119506 A1 | 6/2003 | Singhai et al. |
| 2004/0022212 A1 | 2/2004 | Chowdhury et al. |
| 2004/0038664 A1 | 2/2004 | Stoks |
| 2004/0116149 A1 | 6/2004 | Yukie et al. |
| 2004/0151148 A1 | 8/2004 | Yahagi |
| 2004/0165563 A1 | 8/2004 | Hsu et al. |
| 2004/0203767 A1 * | 10/2004 | Fraser et al. ............. 455/435.1 |
| 2004/0203773 A1 * | 10/2004 | Balasubramanian et al. ............. 455/435.1 |
| 2004/0203788 A1 | 10/2004 | Fors et al. |
| 2004/0204172 A1 | 10/2004 | Herle |
| 2004/0230661 A1 | 11/2004 | Rashid et al. |
| 2004/0243702 A1 | 12/2004 | Vainio et al. |
| 2004/0252669 A1 | 12/2004 | Hosein |
| 2004/0263122 A1 | 12/2004 | Morisawa |
| 2005/0009534 A1 | 1/2005 | Harris et al. |
| 2005/0037729 A1 | 2/2005 | Dupont et al. |
| 2006/0286979 A1 * | 12/2006 | Enderlein et al. ......... 455/435.1 |
| 2008/0019294 A1 * | 1/2008 | Inoue et al. ................ 370/310 |
| 2008/0218196 A1 | 9/2008 | Eckhart |
| 2008/0280608 A1 * | 11/2008 | Yu et al. .................... 455/435.1 |
| 2009/0003255 A1 * | 1/2009 | Mohanty et al. ........... 370/311 |
| 2010/0020781 A1 | 1/2010 | Tayloe et al. |
| 2010/0273483 A1 * | 10/2010 | Cho et al. .................. 455/435.1 |
| 2011/0045824 A1 | 2/2011 | Bischoff et al. |

OTHER PUBLICATIONS

Virtual Fridge Notes—http://3ginthehome.wordpress.com/2009/02/13/8virtual-fridge-notes/, printed from the World-Wide Web: Aug. 27, 2009.

Apple Time Capsule—http://store.apple.com/us/product/MC343LL/A/Time-Capsule-1TB, printed from the World-Wide Web: Sep. 2, 2009.

M. Handley, et al, RFC, 2543, SIP: Session Initiation Protocol, Mar. 1999, first page.

S. Donovan et al., Session Initiation Protocol Extension for Session Timer, Jul. 1, 2002, Internet Engineering Task Force.

C. Perkins, "IP Mobility Support," Request for Comments 2002, Oct. 1996.

W. Cope, U.S. Appl. No. 12/633,262, Use of Femtocell Registration to Create Local Network Share, filed Dec. 8, 2009.

* cited by examiner

METHODS AND SYSTEMS FOR MANAGING REGISTRATION SIGNALING BASED ON OFF-TIME DURATION

BACKGROUND

When a communication device first powers on, the device may be arranged to engage in registration signaling with one or more network entities. Such signaling may function to notify the network that the device is connected, and to give the network an opportunity to authenticate and authorize the device, so that the network may then provide the device with service. For example, when a wireless communication device first powers on, the device may register with a radio access network to facilitate being served by that network, and so that the network will know where the device is located. As another example, when a device powers on and becomes connected with a packet-switched network, the device may register with a packet-gateway and/or a mobile internet protocol (mobile-IP) system to facilitate being served by the packet-switched network. Other examples are possible well.

In practice, after a device initially registers with a network, the network may require the device to reregister periodically or to engage in other network communication as a way of establishing that the device is still connected with the network. If the network does not receive expected reregistration signaling from the device or detects the absence of activity by the device for a threshold period of time, for instance, the network may conclude that the device is no longer connected with the network and may automatically deregister the device. Furthermore, when a device is powering off, the device may be arranged to engage in deregistration signaling with the network, to notify the network that the device is disconnecting from the network, so that the network may similarly deregister the device.

In some cases, a communication device may run a network process that facilitates the device's network registration. A network process may be a stored set of computer instructions that is operable to facilitate network registration. For example, the network process may be a computer program, a set of passive instructions, or a computer application that initiates and directs registration signaling between the device and network entities. The device may start the network process when powering on, and then the network process may facilitate the initial registration signaling with the network. Then, while the device is operating, the network process may continue to manage the device's network registration, for instance, by sending reregistration signaling and/or by responding to network changes (e.g., registering with a new network in response to detecting that the device has moved into a new coverage area). The network process may also function to deregister the device when it disconnects from the network (e.g., when the device powers off or user-input directs the device to disconnect from the network).

In some cases, the network process may stop while the device is still in a power-on state. For instance, a user may activate a process-kill function to stop the network process or the device may enter a non-signaling state (e.g., "airplane mode" or "offline mode") that stops the network process. When the network process restarts, the process may again initiate registration signaling in much the same way that registration is performed after the device powers on.

OVERVIEW

Disclosed herein is a method and corresponding system for managing device registration signaling when a network process starts. In accordance with the disclosure, when a device activates a network process, the device will determine how long this process was turned off. If the device determines that the registration process was turned off for shorter than a predefined duration, then the device will limit the extent of registration signaling in which it engages (possibly not engaging in any registration signaling at all upon turning on the network application). On the other hand, if the device determines that the process was turned off for longer than the predefined duration, then the device will engage in its normal process-on registration signaling.

This method may help reduce or avoid device reregistration signaling that occurs merely as a result of an unexpected stopping of the network process and threshold quick restarting of the process. Without this method, if a device powers off, or ends a network process in some other way, without having deregistered and the device then quickly turns the process back on, the device may engage in its normal process-on registration signaling, even though the device's network registration may be current and may not need to be confirmed. With this method, however, if the device stops the network process and then quickly turns it back on, the device may avoid engaging in such process-on registration but may instead simply reregister again at a next scheduled period or in response to some other trigger.

In one respect, for instance, the present method may involve (i) when a communication device turns on a network process, the device determining how long the process was turned off since it was last on, and (ii) based on at least how long the process was turned off, the device limiting the extent of signaling that it sends to register with a network.

In another respect, an example communication device may include (i) an interface for engaging in network communications, where the interface normally engages in a certain extent of network registration when the device turns on a network process and (ii) control logic for limiting the amount of registration signaling in which the device engages based on how long the process was turned off.

These and other aspects will become apparent to those of ordinary skill in the art by reading the following detailed description, with reference, where appropriate, to the accompanying drawings. Further, it should be understood that the embodiments noted in this summary are only examples and not intended to limit the scope of the invention as claimed.

DETAILED DESCRIPTION

In the following description, a method and corresponding system for managing device registration signaling are disclosed. In accordance with the disclosure, when a communication device transitions from a process-off state to a process-on state, the device will determine how long it was in the process-off state. Further, the device may use this determined duration as a basis for limiting the extent of registration signaling in which it engages.

Determining the duration that the device was in the process-off state may involve computing the difference between the time that the device turns on the process, and the time that the process turned off. To facilitate determining the time when the process turned off, the device may be configured to occasionally record the current time while the process is on. Then, if the device unexpectedly powers off, or otherwise ends the network process, the device may use the most recently recorded time as an approximate time that the process turned off.

In some embodiments, limiting the amount of registration signaling that a communication device sends may involve refraining from sending any registration signaling. In other situations, limiting the amount of registration signaling that a device sends may involve reducing, but not eliminating, registration signaling. For example, if a device typically sends some signaling to register with a radio access network and other signaling to register with a mobile-IP home agent, then the limiting the amount of registration signaling may involve only sending the signaling necessary to register with the radio access network. Alternatively, in this situation, the device may limit registration signaling by only sending the signaling to register with the mobile-IP home agent.

As indicated above, a communication device may use the duration that the process was turned off as a basis for determining whether, and how much, to limit registration signaling. For example, a device may be configured to reduce registration signaling in response to determining that the process-off duration is not shorter than a predefined threshold duration. In this configuration, if the process-off duration is shorter than the threshold duration, then the device may engage in the normal amount of signaling (i.e., without limiting the extent of registration signaling).

In addition to using the process-off duration as a basis for limiting the extent of registration signaling, some methods involve determining whether the device deregistered from the network and then using this determination as a further basis for limiting the extent of registration signaling. For example, a device that stores a record of deregistration events may, when the device restarts a network process, refer to this record and refrain from limiting registration signaling if the record indicates that the device deregistered from the network when the process stopped.

1. Example Architecture

Figure 1:
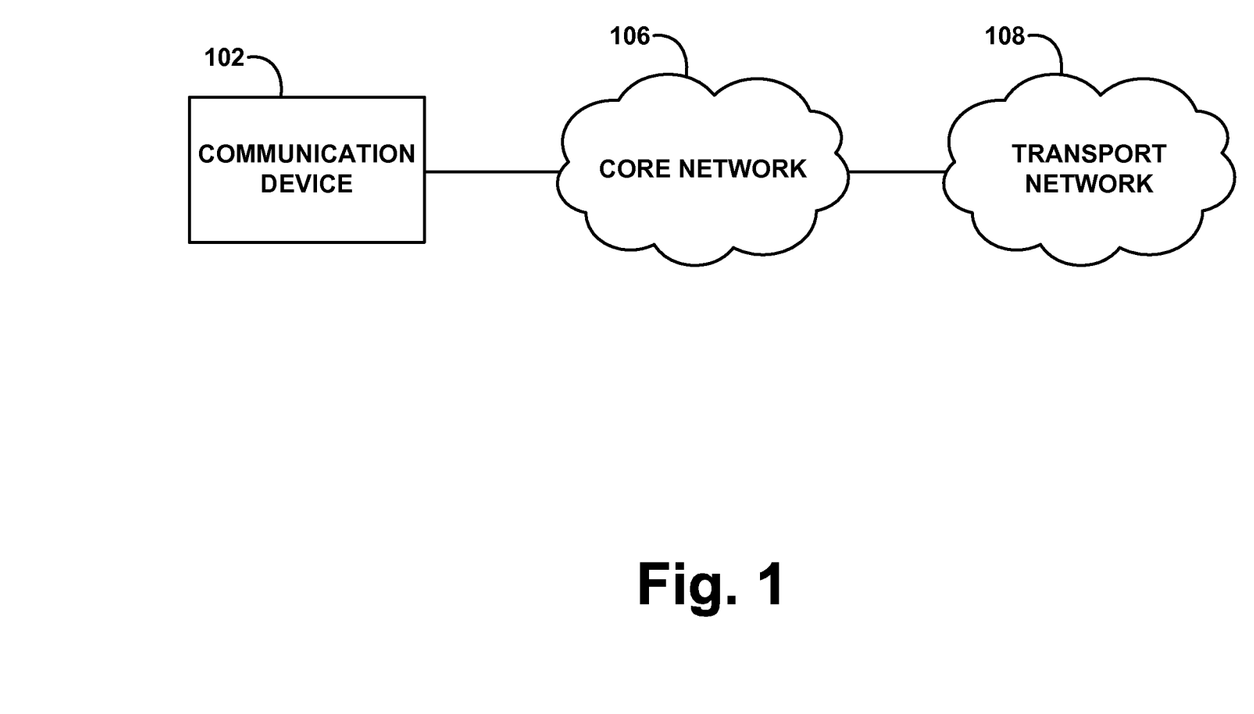
FIG. 1 is a simplified block diagram of a communication system in which the present method can be implemented.
Figure 2:
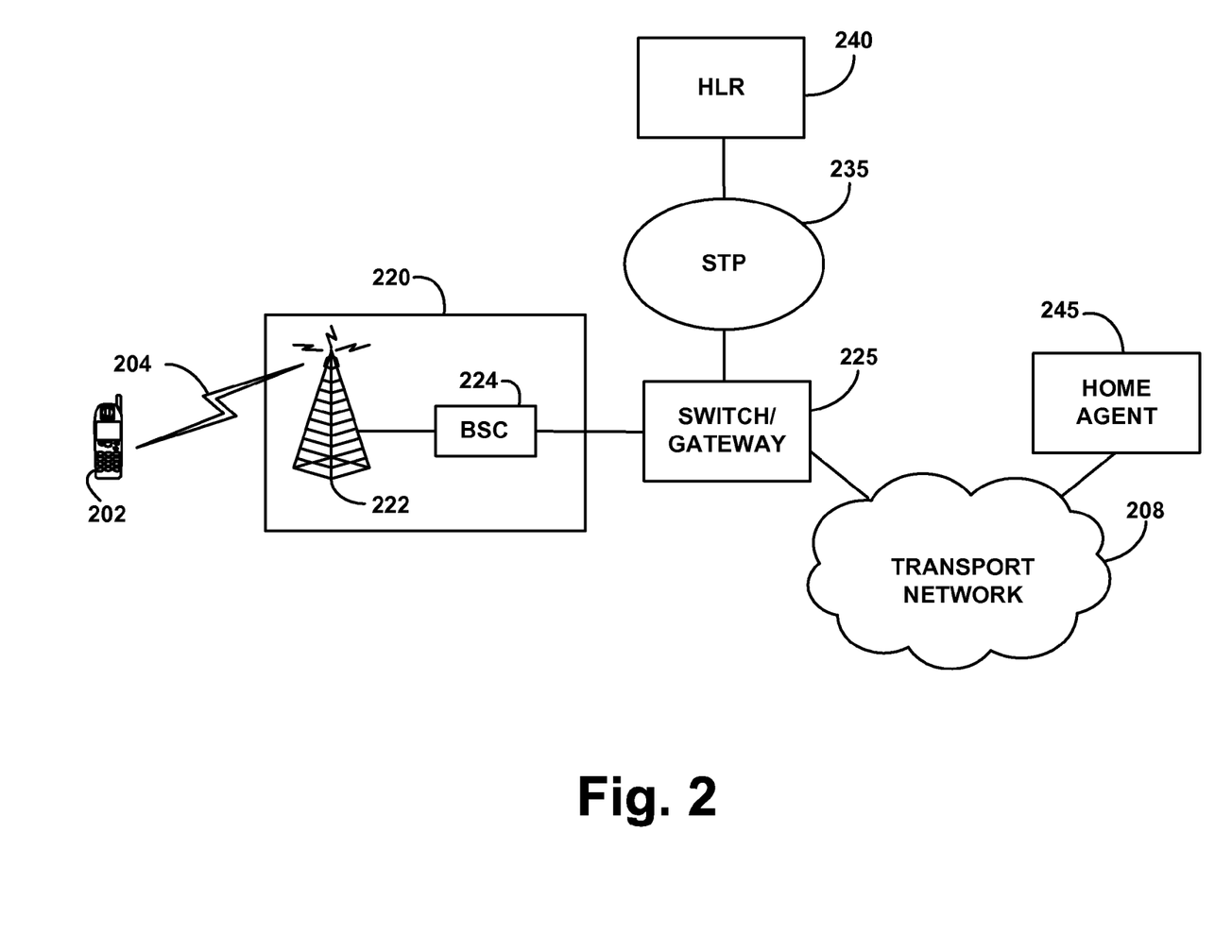
FIG. 2 is a simplified block diagram of another communication system in which the method can be implemented.
Figure 3:
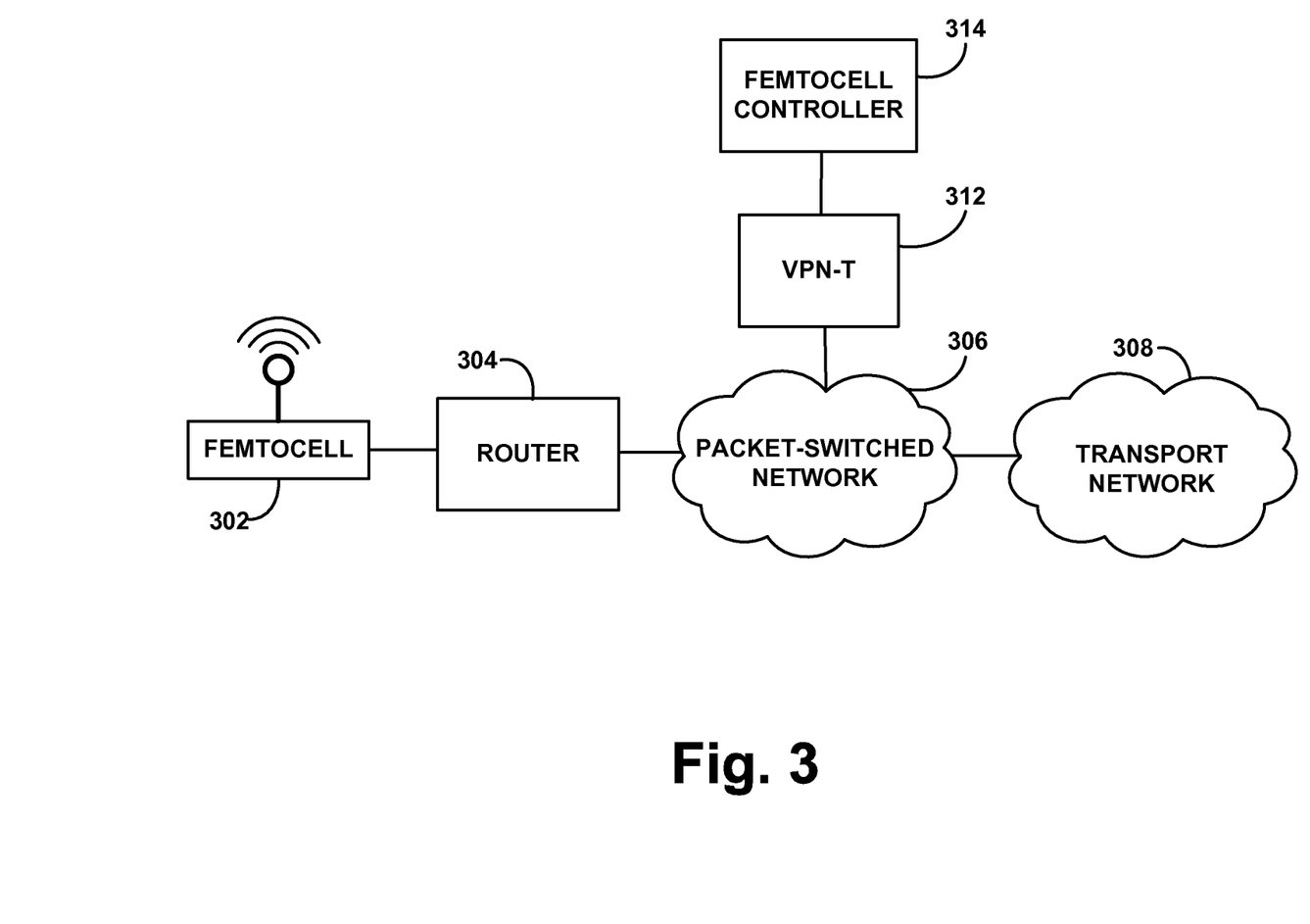
FIG. 3 is a simplified block diagram of yet another communication system in which the method can be implemented.

As noted above, FIGS. 1, 2, and 3 are simplified block diagrams depicting communication systems in which the embodiments described in this disclosure may be used. FIG. 1 illustrates a model of a generalized communication system, and FIGS. 2 and 3 illustrate models of specific example systems. In particular, the communication system of FIG. 2 includes a mobile station being served by a radio-access network (RAN) and the communication system of FIG. 3 includes a femtocell being served by a packet-switched network.

It should be understood that the embodiments depicted in the figures, and other arrangements described herein, are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 1 shows a simplified communication system including a communication device 102 that connects through a core network 106, such as a switching system or a packet-switched network, to a transport network 108, such as the public-switched telephone network (PSTN) or the Internet. In a typical arrangement, communication device 102 registers with core network 106 before communicating on transport network 108. Additionally, once communication device 102 registers with core network 106, the device 102 may register with network elements that are accessible through transport network 108, such as a mobile IP home agent or a communication application.

FIG. 2 shows a particular example system in which the core network is a RAN network. In the system of FIG. 2, mobile station 202 may be, for instance, a cellular phone, a wireless personal digital assistant, a wireless enabled computer, or any other device capable of communication through a RAN-based system.

In the arrangement shown in FIG. 2, mobile station 202 communicates with a base station 220 that includes a base transceiver station (BTS) 222 and a base-station controller (BSC) 224. The mobile station 202 communicates with BTS 222 using radio-frequency signals over an air interface 204. The BTS 222, in turn, communicates with the BSC 224 to send voice and/or data signaling to and from the mobile station 202.

The base station 220 is further coupled with a switch/gateway 225 that connects base station 220 (and, in turn, mobile station 202) with a transport network 208. The switch/gateway 225 may take the form of any number of devices and servers. For example, for voice communication, the switch/gateway 225 may comprise a mobile switching center (MSC). Alternatively, for data communication the switch/gateway 225 may comprise a packet data serving node (PDSN). The base station 220 may communicate with the switch/gateway 225 over a wired and/or wireless interface. It will be appreciated that additional switch/gateway devices or systems may be coupled with the base station 220.

The switch/gateway 225 is also coupled with a signal transfer point (STP) 235. The STP 235 provides for the transfer of signals between different entities in the system. For the particular embodiment shown in FIG. 2, the STP 235 provides for transferring signals between the switch/gateway 225 and a home location register (HLR) 240. The HLR 240 includes registration information for mobile station 202. This registration information may include, for example, a unique mobile identification number for the mobile station 202, and information, including permissions, preferences, and billing information, about the subscriber using mobile station 202.

In addition to storing registration information in the HLR 240, a system may store information about the mobile device in a visitor location register (VLR), which may be implemented in conjunction with the HLR 240, in conjunction with switch/gateway 225, or in some other manner. Additionally, the system may include other entities that are coupled with the STP 235, such as additional switch/gateways devices, service nodes, or any number of other platforms or devices for providing communication services in the system of FIG. 2.

Mobile station 202 and base station 220 may communicate with each other over air interface 204 according to a defined air interface protocol, examples of which include CDMA (e.g., IS-95, IS-2000, 1xRTT, 1xEV-DO, etc.), W-CDMA, iDEN, WiMAX, TDMA, AMPS, GSM, GPRS, UMTS, EDGE, LTE, WI-FI (e.g., 802.11), BLUETOOTH, and others now known or later developed. Such air interface communication may occur on a frequency known as a "carrier" (which may actually be a pair of frequencies, one for communications from the base station 220 to the mobile station 202, and another for communication from the mobile station 202 to the base station 220). On such a carrier, the base station may emit a pilot signal, which is a control signal that a mobile station may detect as an indication of base station coverage. In particular, as mobile station 202 operates in the coverage area of base station 220, mobile station 202 may detect the base station's pilot signal. In response, the mobile station 202 may initiate communication with base station 220 and, in some cases, initiate registration with the network.

Mobile station 202 may register in various ways and with various network entities. As one example procedure, mobile station 202 may register by sending a registration request message (e.g., an access probe) over air interface 204 to base station 220. This request message may be signaling that carries an identifier of mobile station 202 and perhaps other pertinent information. When base station 220 receives a request message from mobile station 202, base station 220 may pass the request message along to switch 225, which responsively may send a registration notification message to the communication device's HLR 240. Then, HLR 240 may update the communication device's profile to indicate where mobile station 202 is operating (e.g., which switch is serving mobile station 202) and may send registration information to an associated VLR. HLR 240 may further carry out an authentication process, and then send a registration response, which may propagate to mobile station 202.

As another registration example, mobile station 202 may register with a mobile internet protocol (mobile-IP) home agent 245 to assist in data communications over transport network 208. Mobile-IP is a communication protocol in which a mobile station is associated with a particular network address on a transport network regardless of the core network elements that connect the mobile station to the transport network. To use mobile IP, mobile station 202 may send a registration request message to home agent 245 through transport network 208. The request message may include device information, such as an equipment identity number, and network information, such as the switch/gateway that currently serves the device. In some embodiments, network or device information may be added to the request message by other network entities. For example, while the message propagates to the mobile-IP home agent 245, the serving switch/gateway 225 may annotate the request message with an indication of the switch/gateway's network address. Upon receiving the request message, home agent 245 may then perform additional registration signaling with mobile station 202 and/or with other network entities. While mobile station 202 is registered with home agent 245, home agent 245 may route any signaling (e.g., a datagram) that is sent to the mobile station's 202 network address to the switch/gateway 225 that is serving mobile device 202. A communication device could also perform other registration processes when starting a network process.

In addition to staring a network process, various trigger events may cause a communication device to register with the network. For example, a communication device may register (i) when the communication device enters a new area (e.g., sector and/or cell) in response to a distinct "reg_zone" parameter the communication device receives in an air interface control channel message from the base station, (ii) on a periodic basis, with a period indicated by a "reg_period" parameter (or directive) that the communication device receives in an air interface control channel message from the base station, and (iii) when the communication device receives or places a call.

FIG. 3 shows an example communication system in which a communication device accesses a transport network 308 through a packet-switched network 306. In FIG. 3, the communication device is shown as a femtocell 302. Femtocells (also sometimes referred to as picocells, ubicells, microcells, or as femto-, pico-, ubi-, or micro-base stations or base transceiver stations) are essentially small, low-power, low-capacity, and low-cost versions of a macro-scale BTS. As shown, femtocell 302 connects with transport network 308 through a user's broadband router 304 and a packet-switched network 306. Further, the femtocell 302 may include a wireless communication interface arranged to serve wireless communication devices in much the same way that a macro-scale BTS does, providing a pilot signal and so forth, as described above.

To facilitate communication between femtocell 302 (and, in turn, between any devices that femtocell 302 serves) and transport network 308, femtocell 302 is communicatively connected to a femtocell controller 314, which may control femtocell 302 in a similar way to how BSC 224 controls a macro-scale BTS 222. In practice, femtocell 302 may connect to femtocell controller 314 by establishing a virtual private network (VPN) connection with VPN-terminator (VPN-T) 312. Through the established VPN connection, or when establishing the VPN connection, femtocell 302 may register with femtocell controller 314 and femtocell controller 314 may manage various aspects of femtocell operation, such as monitoring mobile stations that connect with femtocell 302, for instance.

To register, femtocell 302 may send signaling including, for instance, equipment information (e.g., device identification, user-profile information, etc.), network information (router characteristics, current IP address, etc.), and authentication data (e.g., password, location data, answers to challenge questions, etc.) to femtocell controller 314. In response, femtocell controller 314 may also send registration signaling to femtocell 302. For example, femtocell controller 314 may request authentication information or notify femtocell 302 of registration status. After femtocell 302 registers with femtocell controller 314, femtocell 302 may communicate on transport network 308 through packet-switched network 306. In some cases, packet-switched network 306 may connect to transport network 308 through additional network elements, such as an MSC, a switch/gateway, or a PDSN.

Figure 4:
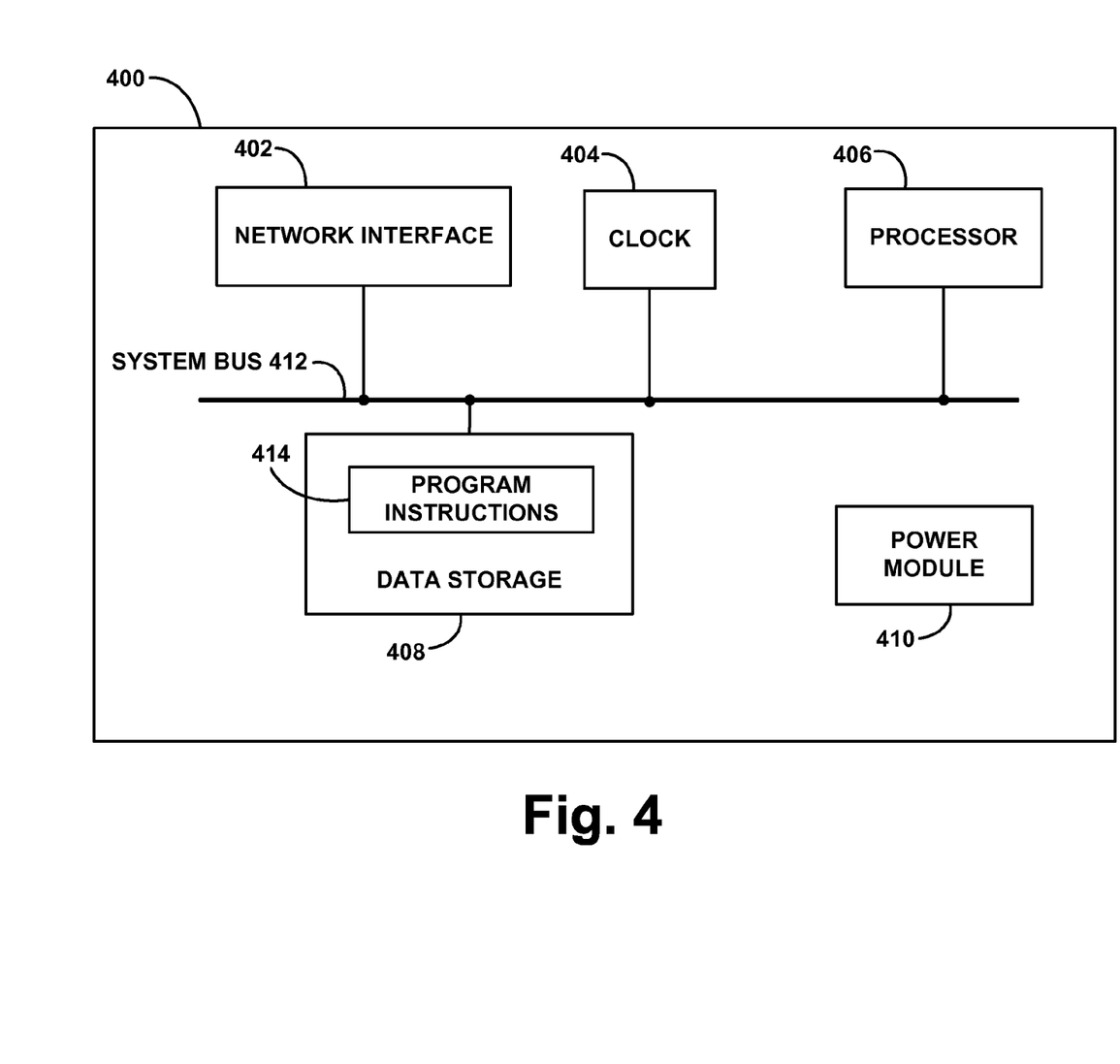
FIG. 4 is a simplified block diagram showing elements of an example communication device.

FIG. 4 shows elements of an example communication device 400 in which the embodiments described in this disclosure may be used. As discussed above, communication device 400 may be any of a variety of device types (e.g., cell phone, mobile station 202, femtocell 302, computer, tablet, PDA, etc.)

As shown, communication device 400 includes a network interface 402, a clock or other time determination means 404, a processor 406, data storage 408, and a power module 410, all of which may be coupled together by a system bus, network, or other connection mechanism 412.

Network interface 402 may include wired and/or wireless connection hardware and associated logic to enable device 400 to engage in communication with a communication network. For example, a wireless network interface may include a wireless chipset and an associated antenna, arranged to connect with network stations such as a BTS 222 or femtocell 302. As another example, a wired network interface may include connection ports and associated chipsets arranged to interface with wired connections to, for instance, router 304. In some embodiments, control logic for managing network communications may be integrated with the network interface. In such embodiments, whenever the device sends registration signaling to the network, the integrated control logic may manage the extent of signaling that device 400 sends.

Clock 404 may include any means for determining the time at the device 400. For instance, clock 404 may include an internal timekeeping element (potentially with a dedicated power module to avoid losing track of time when device 400 powers off). Additionally or alternatively, a time determination means may include an interface for connecting with an external timekeeping element, such as a satellite clock or base station. Some clocks may include both internal and external timekeeping means. For example, an in-device clock may typically keep time autonomously but may also periodically engage in a calibration process that involves accessing a remote clock.

Processor 406 may include one or more general-purpose processors and/or one or more special-purpose processors such as application-specific integrated circuits or digital signal processors, and processor 406 may be integrated in whole or in part with network interface 402 or with one or more other mobile station components. Data storage 408 may include one or more volatile and/or non-volatile storage components, such as optical, magnetic, or flash storage, and may be integrated in whole or in part with processor 406. As shown, data storage 408 may include program instructions 414 that can be executed by processor 406 to carry out various functions described herein.

In an exemplary embodiment, the processor may carry out one or more network processes to facilitate communication between device 400 and network entities through network interface 402. The network processes may include communication processes (e.g., phone communication, short message service, Internet communication, etc.), location processes (e.g., global positioning system processes), or other processes that involve communication with network entities (e.g., entities like those shown in FIGS. 1-3). In some cases, a network process may be integrated within the network interface 402 or processor 406, so that device 400 starts the network process whenever it powers on.

Power module 410 may be any element that provides electrical power to communication device 400. For instance, power module 410 may interface with an external power source (e.g., an electrical outlet, an external battery, or the power module of a connected device) and/or include an internal power source (e.g., a battery, generator, or power storing circuitry). The power module may include switching means for connecting and disconnecting the device from the power source when the device transitions from a power-on state to a power-off state. In some cases, the process-off state may also be a power-off state, since the device may end a network process when powering off. A power-off state may be a state in which the device 400 is disconnected from all electrical power and in which all functions of the device 400 are suspended. In other situations, device 400 may continue to receive some power in the power-off state and may continue to run some processes. For example, when transitioning to a power-off state, device 400 may disconnect some elements (for instance, network interface 402 and processor 406) from the output of power module 410, but power module may continue to supply power to other elements (for instance, clock 404). As another example, a device that receives power from multiple sources could enter a power-off state when one of the power sources is disconnected from the device, while potentially continuing to receive power from the other power sources.

If the process-off state is not a power-off state, or if a device continues to receive some power in a process-off state, the device may carry on other processes while the network process is off. For example, a device may suspend a network process, but continue to provide power to volatile memory systems to facilitate efficient powering-on of the device. As another example, a device may turn off a network process without stopping any other processes. Other examples are also possible.

Communication device 400 may transition to a power-off state, and thus transition to a process-off state, as a result of being physically disconnected from a power source. For example, a device that receives power from a battery cell may transition to a process-off state if the battery cell stops providing power (e.g., the battery runs out of power) or if the battery cell is removed from device. As another example, a device that receives power from a wall outlet may transition to a process-off state if the outlet stops providing power (e.g., during a power outage) or the device becomes unplugged from the outlet.

In addition to physical disconnection of device 400 from its power source 410, device 400 may transition to the process-off state as a result of internal switching or programming. For example, device 400 may turn off the process as a result of a user activating a process-kill or power-off operation (e.g., by actuation of a power switch or power button, by selecting a process-kill or power-off function from a user-interface, etc.) As another example, device 400 may transition to the process-off state as a result of a hardware malfunction or software error. For example, if the internal circuitry of device 400 is damaged, device 400 may disconnect the circuitry from power module 410 (e.g., blowing a fuse or tripping an overload switch) to prevent further damage. As another example, a software error may cause device 400 by restarting the network process without receiving user-input to do so. Further, an automatic power-off process may turn off the process. For example, an automatic process may turn off the device to prevent damage to the device (e.g., if the device detects overheating or physical stress on the device) or to save electrical power (e.g., if the device is inactive for a threshold long period or if user-settings prescribe automated power-off procedures to save energy). Various additional examples are possible.

2. Example Operation

Figure 5:
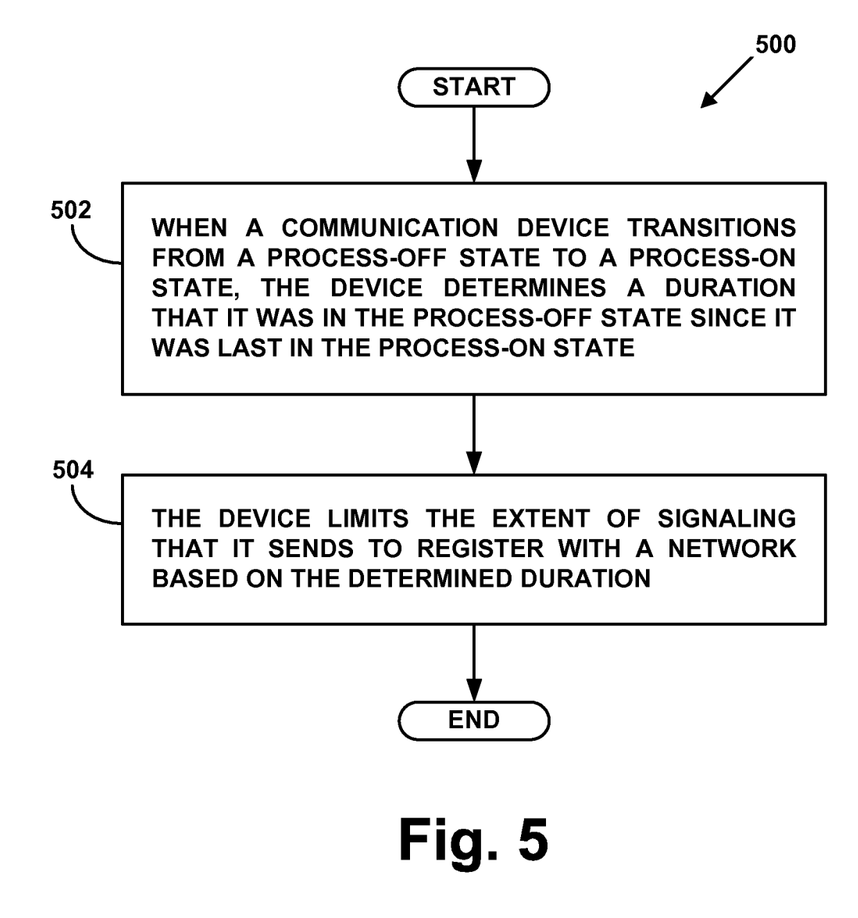
FIG. 5 is a flow chart depicting functions that can be carried out in accordance with an exemplary embodiment.

A described above, an exemplary embodiment may help to manage registration signaling by a communication device that normally sends an extent of signaling to register with a network when starting a network process. To illustrate, FIG. 5 is a flow chart showing steps of an example method 500. As shown, example method 500 involves when a communication device transitions from a process-off state to a process-on state, the device may determine a duration of time since it was last in the process-on state, as shown at block 502. Additionally, at block 504, example method 500 involves the communication device limiting the extent of registration signaling that it sends, based on the determined duration.

a. Determining a Process-Off Duration

The communication device may determine a process-off duration by comparing the current time (when the process turns on) to a previous time that the device was in the process-on state before the process turned off. For example, the device may compute the process-off duration as the difference between the current time and the last recorded time that the device was in the process-on state. As another example, the device may determine the process-off duration as the difference between the current time and a recorded time when the device performed some particular function (e.g., registration with a network, placing a call, etc.) associated with the network process.

In order to determine a previous time that the device was in the process-on state, the device may occasionally record data representing the current time as a time that the device is in the process-on state. In some cases, the device may store each of the recorded times in data storage 408. Alternatively, the device may store only the most recently recorded time in data storage 408, with each recordation step overwriting the previously-recorded time. The data that represents each recorded time may include, for instance, the time of day, the date, a margin of error in determining the time, and/or location information (e.g., time zone, local calendar) used in time determination. In some embodiments, the device may record time periodically, at set time intervals. In such an embodiment, the device may determine the time interval based on network characteristics, storage capacity, battery level, user-preferences, and/or usage statistics. As one example, if a network specifies a registration period in which the device must periodically reregister, then the device may use this registration period as a basis for determining the set time interval for recording times. In particular, the device may be programmed to record time more frequently than the registration period of the network. As another example, if a device detects that its storage capacity is threshold full, then the device may be programmed to lengthen the time interval in order to minimize recorded times in storage. Various other examples are possible.

In some cases, the device may record and update times when the device performs some specified function (e.g., each time that the device reregisters on the network, each time data or voice-communication signaling occurs, etc.). In such an embodiment, the process-off duration may represent the duration of time since the device last performed the specified function. If the network process is stopped by activation of a process-kill function, the device may, in some implementations, record the time that the device performs the process-kill function. Hence, the process-off duration may represent the time since the device stopped the network process.

When the process turns on, the device may determine the current time by, for instance, referring to an internal clock 404. In some cases, determination of the current time may involve the device engaging in some signaling with network elements or even a partial registration of the device with a communication network. For example, a device may receive the current time from a base station or register with the RAN to receive a time update. In practice, the device may determine the current time by analyzing various data including, for instance, the time of day at the device, the date at the device, a margin of error in determining the time, and/or location information for the device.

Using the current time and the recorded time that the device was in the process-on state, the device may determine a process-off duration. In some implementations, the device may compute the process-off duration by finding the difference between the recorded time and the current time. In other implementations, the device may compute the process-off duration in other ways.

Typically, the process-off duration may include the duration of time that the device was in the process-off state. In some cases, the process-off duration may also include portions of time that the device was in the process-on state. For example, a device may spend some time in the process-on state after the recorded time was recorded before the process turns off. As another example, the device may spend some time in the process-on state before determining the current time when the process turns on. In either of the preceding examples, if a device determines the process-off duration as the difference between the last recorded time and the time that the process turns on, then the process-off duration may include portions of time that the device was in each of the process-off state and the process-on state. More generally, the process-off duration may be any duration of time that includes time spent in the process-off state, regardless of whether the device was in the process-on state for some (or even a majority) of the process-off duration.

b. Limiting the Extent of Registration Signaling

Based on the determined process-off duration, the communication device may limit the extent of registration signaling in which it engages upon entering the process-on state, as illustrated by block 504 of method 500. For example, if the process-off duration is threshold short, then the device may reduce the extent of registration signaling in which it engages. As herein discussed, a system may use various procedures to determine whether a process-off duration is threshold short, and, based on this determination, the system may use various techniques for limiting registration signaling.

In some embodiments, the device may use a predefined threshold duration in determining how to limit the extent of process-on registration signaling. For example, when the process-off duration is shorter than a predefined threshold duration, the device may reduce the amount of registration signaling that it sends. In addition, when the process-off duration is longer than the threshold duration, the device may refrain from reducing the amount of registration signaling that it sends.

The device or a user of the device may define the threshold duration as any nonzero duration of time. In particular, the device may be programmed to receive user-input defining a threshold duration or, in the absence of user-input, define a threshold duration based on, for instance, network characteristics, device settings, device characteristics, and/or usage statistics. As one example, a device may provide a user-interface in which the user may specify the threshold duration (e.g., by selecting a duration from a list or typing in a threshold duration). As another example, a device may be programmed to define a threshold duration that is shorter than the network's registration period (i.e., a network-specified length of time that represents how often the device must reregister with the network in order to avoid being deregistered). Further, after the device defines the threshold duration, it may dynamically alter the threshold duration. For example, if the device registers with a new network, the device may define a new threshold duration based on the new network's characteristics. As a further example, a device may lengthen the threshold duration in order to increase the likelihood that the device will reduce process-on registration signaling. In particular, the device may be programmed to lengthen the threshold duration in response to detecting that the device's battery is running low on power, so that the device's power may be preserved as much as possible.

In some embodiments, a device may use multiple threshold durations as bases for applying multiple techniques to limit registration signaling. For example, if a device typically registers with more than one network (e.g., a RAN and a packet-switched network), then the device may define a threshold duration for determining how to limit registration with each respective network. In particular, a device may define a first threshold duration associated with a RAN and then, in response to determining that the process-off duration is shorter than the first threshold duration, the device may limit registration signaling that the device sends to register with the RAN. Likewise, the device may define a second threshold duration associated with a packet-switched network and then, in response to determining that the process-off duration is shorter than the second threshold duration, the device may limit registration signaling that the device sends to register with the packet-switched network. Other examples of threshold durations are possible.

In some implementations, limiting the extent of process-on registration signaling that a device sends may involve refraining from sending any registration signaling when the process starts. For example, in response to determining that the process-off duration is threshold short, the device may refrain from sending any registration signaling to register on a network. In some cases, a device that normally registers with multiple networks may refrain from sending registration signaling to any of the multiple networks. In other cases, upon turning a process on, the device may refrain from sending registration signaling to any of the multiple networks.

After starting the network process, the device may determine when next to send reregistration signaling, based on the extent of registration signaling that the device sent when starting the process. In particular, to avoid expiration of a network's reregistration period, a device that refrained from sending process-on registration signaling may need to send reregistration signaling sooner than a device that registered normally when it began the network process. As an example situation, if a network requires reregistration every ten minutes, and if a device restarts a network process five minutes after last registering with the network, then the device may refrain from sending registration signaling when restarting the process. However, this device may need to reregister within five minutes of restarting the process to avoid deregistration. In contrast, if the device had registered when restarting the process, then it would not need to reregister for ten minutes after restarting the process. A device may use registration history and the predefined registration period as a basis for determining when the device must reregister with the network.

Some embodiments may limit the extent of registration signaling that the device sends without entirely refraining from sending registration signaling. For example, a device may send signaling to request network information (e.g., the current time, service provider information, or location information) without sending all of the registration signaling that it normally sends upon starting a network process. As another example, if a device sends more signaling to register initially with a network than to reregister, and the device normally engages in initial registration signaling when starting a network process, then, based on the process-off duration, the device may send reregistration signaling, instead of initial registration signaling, when starting the process. Various other examples are possible.

In addition to the process-off duration, an example system may use other bases for determining how much to limit registration signaling. For instance, if a device stores data representing any deregistration events in which it engages, then the device may use these data to (i) determine whether the device has recently deregistered from the network, and (ii) only reduce the registration signaling that it sends when starting the network process in response to determining that the device has not deregistered from the network. Such a technique may help prevent the device from attempting to reducing registration signaling when the device deregistered from the network when ending the process (i.e., the device turned the process off normally). As another example, a device may determine whether its geographic location has changed significantly since it last registered on a network (for instance, if the pilot signal of the previous base station is no longer detected) and, then, the device may reduce registration signaling only if the geographic location has not changed significantly. Such a technique may help a device that has moved outside of a previous coverage area, to recognize that it must register in the new coverage area regardless of whether the device's previous registration would still be current. Various additional examples are possible.

3. Conclusion

Exemplary embodiments have been described above. It should be understood, however, that variations from these embodiments are possible, while remaining within the true spirit and scope of the invention.

We claim:

1. A method for managing registration signaling by a communication device, wherein the communication device periodically registers with a network at a periodic registration interval, wherein the communication device has a process-on state and a process-off state, and wherein the communication device normally sends an extent of signaling to register with the network upon transitioning from the process-off state to the process-on state, the method comprising:

while the communication device is in the process-on state, the communication device periodically recording time at a periodic time-recording interval shorter than the periodic registration interval, whereby the communication device records time more frequently than the communication device registers with the network;

upon transitioning from the process-off state to the process-on state, the communication device determining a duration as how much time has passed since a last time that the communication device recorded in accordance with the periodic time-recording interval; and based on at least the determined duration, the communication device limiting the extent of signaling that the communication device sends to register with the network.

2. The method of claim 1, wherein the process-off state is a state in which the device is powered off and wherein the process-on state is a state in which the device is powered on.

3. The method of claim 1, wherein the communication device normally sends the extent of signaling to register with the network via a wireless communication link, and wherein limiting the extent of signaling that the communication device sends to register with the network comprises limiting the extent of signaling that the communication device sends via the wireless communication link to register with the network.

4. The method of claim 1, wherein determining the duration as how much time has passed since the last time that the communication device recorded in accordance with the periodic time-recording interval comprises:

determining a current time of the communication device transitioning from the process-off to the process-on state; and comparing the determined current time to the last time that the communication device recorded in accordance with the periodic time-recording interval.

5. The method of claim 1, wherein limiting the extent of signaling that the communication device sends to register with the network comprises:

if the determined duration is shorter than a threshold, then reducing the extent of signaling that the communication device sends to register with the network; and if the determined duration is longer than the threshold, then not reducing the extent of signaling that the communication device sends to register with the network.

6. The method of claim 1, further comprising:
upon transitioning from the process-off state to the process-on state, making a determination of whether the communication device deregistered from the network;
if the determination is that the communication device deregistered from the network, then not reducing the extent of signaling that the communication device sends to register with the network; and
if the determination is that the communication device did not deregister from the network, then reducing the extent of signaling that the communication device sends to register with the network.

7. The method of claim 1, wherein limiting the extent of signaling that the communication device sends to register with the network comprises refraining from sending any signaling to register with the network.

8. The method of claim 1, wherein the extent of signaling that the communication device normally sends to register with the network comprises (i) signaling to register with a radio access network and (ii) signaling to register with a mobile-IP home agent, and
wherein limiting the extent of signaling that the communication device sends to register with the network comprises refraining from sending the signaling to register with the radio access network.

9. The method of claim 1, wherein the extent of signaling that the communication device normally sends to register with the network comprises (i) signaling to register with a radio access network and (ii) signaling to register with a mobile-IP home agent, and
wherein limiting the extent of signaling that the communication device sends to register with the network comprises refraining from sending the signaling to register with the mobile-IP home agent.

10. A communication device comprising:
a network interface for engaging in network communications, wherein the network interface normally periodically engages in network registration at a periodic registration interval, and wherein the network interface engages in an extent of network registration when the communication device transitions from a process-off state to a process-on state; and
control logic for (i) periodically recording time at a periodic time-recording interval shorter than the periodic registration interval, (ii) upon transitioning of the communication device from the process-off state to the process-on state, determining a current time and determining a duration as how much time has passed from a last time that the communication device recorded at the periodic time-recording interval to the determined current time, and (iii) limiting the extent of network registration based on the determined duration.

11. The communication device of claim 10, further comprising a power module for providing power to the communication device when the communication device is in the process-on state, and wherein the communication device executes the control logic in response to the power module starting to provide power to the communication device.

12. The communication device of claim 10, further comprising a processor and data storage, wherein the control logic comprises program instructions stored in the data storage and executable by the processor.

13. The communication device of claim 12, wherein the processor runs a network process when the communication device is in the process-on state, and wherein the communication device executes the control logic in response to the processor starting to run the communication process.

14. The communication device of claim 10, wherein the control logic is integrated with the network interface.

15. The communication device of claim 11, wherein the extent of network registration comprises at least radio access network registration, and wherein limiting the extent of network registration comprises causing the communication device to refrain from engaging in the radio access network registration.

16. The communication device of claim 10, wherein the extent of network registration comprises at least mobile-IP registration, and wherein limiting the extent of network registration comprises causing the communication device to refrain from engaging in the mobile-IP registration.

17. The communication device of claim 10, wherein
limiting the extent of network registration based on the determined duration comprises:
if the determined duration is shorter than a threshold, then reducing the extent of network registration; and
if the determined duration is longer than the threshold, then refraining from reducing the extent of network registration.

18. A method for managing network registration by a communication device, wherein the communication device normally periodically engages in network registration at a registration interval, and wherein the communication device normally engages in an extent of network registration when the communication device transitions from a power-off state to a power-on state, the method comprising, upon transitioning of the communication device from the power-off state to the power-on state:
the communication device determining a current time;
the communication device comparing the determined current time to a last time that the communication device recorded at a periodic time-recording interval shorter than the registration interval, to determine a duration from the last time that the communication device recorded at the period time-recording interval to the determined current time; and
the communication device limiting the extent of network registration based on the determined duration that the communication device was in the power-off state.

19. The method of claim 18, wherein limiting the extent of network registration based on the determined duration comprises:
if the determined duration is shorter than a threshold, then reducing the extent of network registration; and
if the determined duration is not shorter than the threshold, then not reducing the extent of network registration.

* * * * *